Feb. 28, 1928.
R. D. MAILEY
1,660,650
SEAL
Original Filed Oct. 16, 1923
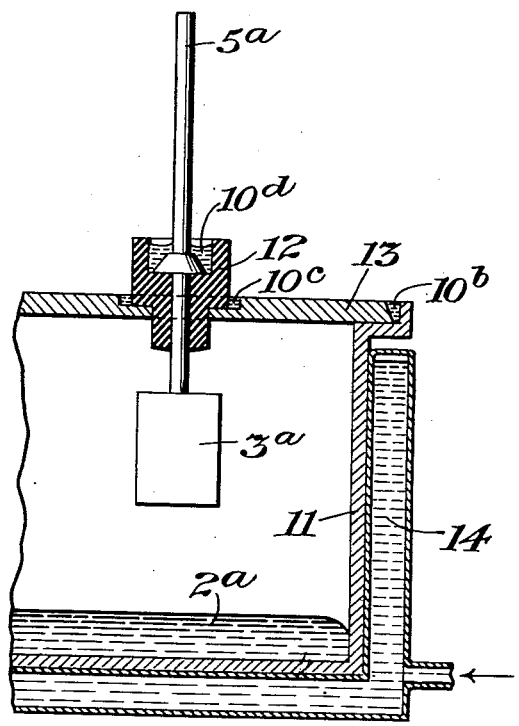
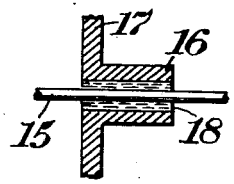

Patented Feb. 28, 1928.

1,660,650

UNITED STATES PATENT OFFICE.

ROY D. MAILEY, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

SEAL.

Original application filed October 16, 1923, Serial No. 668,932. Divided and this application filed June 16, 1925, Serial No. 37,469. Renewed June 21, 1927.

The present invention relates to hermetic seals useful in the arts generally.

I have discovered that a ductile element, or a compound, having the property, when in molten or fused condition, of wetting glass and metal is useful for the purpose of hermetically sealing a lead wire to and through the wall of a glass of fused quartz or metal container, and for sealing together parts of metal closures or metal and glass parts of closures, and that, among others, one such material is silver chloride (AgCl). The use of such a material greatly facilitates the manufacture of such apparatus in that it no longer is necessary to subject the glass and the lead wire to be joined thereto to high temperatures for long periods of time nor is it necessary to work them together at such high temperatures. Thus the losses attendant upon such high temperature operations due to a volatilization of the glass or of the glass and the metal is avoided by the use of sealing materials. Silver chloride (AgCl) has a relatively low fusing point and the property of wetting glass and metal when molten or fused thereto and of hermetically maintaining the seal thus effected when solid due to the fact that it is sufficiently ductile to adjust itself to and compensate for the volume changes of the joined surfaces incident to heating and cooling.

I have also discovered that the amorphous state which fused silver chloride assumes on cooling makes that compound particularly adapted for a sealing because of its strength, its co-efficient of expansion, its wax-like adhering quality and its fusing temperature.

The invention is particularly useful in connection with vapor electric apparatus having a fused quartz container and wherein there is wide diversity of co-efficients of thermal expansion between the quartz wall and an electrode lead wire passing through said wall, although the invention is equally applicable in devices where the co-efficients of thermal expansion of the wall and the member to be hermetically joined thereto, either a lead wire or another wall, are substantially equal and, also, to apparatus generally where the co-efficients of expansion of the members to be hermetically joined play no part in the operation of the apparatus. It is to be understood, however, that the silver chloride seal of my invention is useful in the arts generally between metal parts.

By way of illustration I have shown my invention as applied to a mercury vapor rectifier, but it is to be understood that it is useful in connection with other types of evacuated electric apparatus or to apparatus generally wherein hermetic seals or joints are requisite parts of the walls of such apparatus.

In the accompanying drawings, Figure 1 is a vertical section of a portion of a rectifier having a metal container showing the sealing material as used to seal a metal cover to the container; to seal an insulated bushing into the cover; and to seal the electrode lead into the insulated bushing, and Fig. 2 is a sectional view showing a metal wall having a boss formed thereon with an opening therethrough, an electrode extending through the opening and a seal of fused silver chloride between the wall and the electrode.

In Figure 1 the container of the rectifier is shown at 11, having a mercury cathode $2^a$ therein and an anode $3^a$ mounted on a lead wire $5^a$ passing through a bushing 12 of vitreous material such as glass, quartz or of other equivalent and suitable insulating material under a cover 13 for the container 11. A cooling jacket for the rectifier is shown at 14. The cover 13 of metal is hermetically joined or sealed to the container 11 by a silver chloride joint $10^b$, and the bushing 12 is joined or sealed to the cover 13 by a silver chloride joint $10^c$ and the lead wire $5^a$ is joined to the bushing 12 by a silver chloride joint $10^d$. It will, of course, be understood that any other member of a rectifier can be hermetically sealed through the wall of the rectifier container 11—13 by the use of silver chloride after the manner shown and described above.

The sealing material $10^b$, $10^d$, $10^c$, should be an element or compound that wets the surfaces to be hermetically joined and which elements or compounds when solid are sufficiently ductile to adjust themselves to the volume changes of the joined surfaces incident to heating and cooling. One such material is silver chloride (AgCl). Another suitable material is sulphur.

In Figure 2 is shown an electrode 15 sealed through the boss 16 of the metal wall 17 by means of the fused silver chloride seal 18.

By virtue of the use of a sealing material having the property of ductility when cold and of wetting glass, vitreous material and metals when hot, I am able in a single sealing step to produce hermetic seals between materials having wide differences in co-efficients of thermal expansion as well as between materials having no such difference. And, it is to be understood that in the drawing the closure element 13 which is shown as preferably being of metal may be of glass or fused quartz and that the electrode or electrodes of the device are sealed either through the wall of the envelope proper or through the cover.

In the above description the term "ductility" is used to describe a desired property of the sealing material when cold, and it is to be understood that it is the property of "plastic flow" of the material that is being referred to, which property is exemplified in a solid which deforms slowly under large forces without breaking or cracking and flows somewhat after the nature of wax. This property is inherent in silver chloride which also has the further desirable property of being unaffected structurally by mercury to the vapors of which the sealing material is subjected when used in mercury vapor devices, and it also possesses the further necessary property of a vapor pressure so low that it does not interfere with the functioning of gas or vapor electric devices or of vacuum electric devices in which it is used as a sealing material.

This is a division of my copending application Serial Number 668,932, filed October 16, 1923.

I claim—

1. A seal between metal parts comprising fused silver chloride.

2. A seal between metal parts comprising silver chloride in the amorphous state.

3. In electric apparatus, a metal envelope, a metal closure therefor, and a seal therebetween comprising fused silver chloride.

4. In electric apparatus, a metal envelope, a metal closure therefor, a seal between the envelope and closure comprising fused silver chloride, an electrode extending through the metal into the envelope, and a seal between the metal and the electrode comprising fused silver chloride.

5. In electric apparatus, an envelope of metal, an electrode extending through said envelope, and a seal therebetween comprising fused silver chloride.

6. In electric apparatus, a metal envelope, a metal closure therefor, a seal comprising fused silver chloride therebetween, an electrode passing through the metal, an insulating bushing between the electrode and the metal, and seals of fused silver chloride between the bushing and the metal and between the bushing and the electrode.

7. In electric apparatus, an envelope having a metal wall, an electrode extending through said wall, an insulating bushing about the electrode, and seals comprising fused silver chloride between the bushing and the metal and between the bushing and the electrode.

8. In electric apparatus, an envelope having a metal wall, an electrode extending through the wall, and a seal of fused silver chloride between the said wall and said electrode.

9. A seal between metal parts comprising material which has the property when in the molten or fused condition of wetting metal and when solid or plastic flow and wax-like adhering qualities, and of a vapor pressure similar to that of silver chloride.

10. A seal between metal parts comprising material which has the property when in the molten or fused condition of wetting metal and when solid or plastic flow and wax-like adhering qualities and of a vapor pressure similar to that of silver chloride, and of being unaffected structurally by mercury.

11. In electric apparatus a seal between metal parts comprising material which has the property when in the molten or fused condition of wetting metal and when solid of plastic flow and wax-like adhering qualities, of a vapor pressure similar to that of silver chloride and being unaffected structurally by mercury.

12. In electrode apparatus, in combination, a metal container, an electrode passing through the metal, an insulating bushing between the metal and the electrode, and seals between said metal and said bushing, and between said bushing and said electrode, each of said seals comprising a material having a vapor pressure similar to that of silver chloride which is applicable by melting, pouring and allowing to cool and which has the property when in the molten or fused condition of wetting metal and when solid of plastic flow and wax-like adhering qualities and being unaffected structurally by mercury.

13. In electric apparatus a container having a wall, a conductor extending through said wall, and an air tight seal between said wall and said conductor of a material having a vapor pressure characteristic similar to that of silver chloride which is applicable by melting, pouring and allowing to cool and which has the property when in the molten or fused condition of wetting metal and vitreous substances and when solid of plastic flow and wax-like adhering qualities.

Signed at Hoboken, in the county of Hudson and State of New Jersey, this 8th day of June, A. D. 1925.

ROY D. MAILEY.